US008639366B2

(12) United States Patent
Tachibana et al.

(10) Patent No.: US 8,639,366 B2
(45) Date of Patent: Jan. 28, 2014

(54) CONTROL APPARATUS AND IMAGE FORMING APPARATUS

(75) Inventors: Yuta Tachibana, Toyokawa (JP); Norihiko Nakano, Hoi-gun (JP); Hiroyuki Watanabe, Aichi-ken (JP); Tomonobu Tamura, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 340 days.

(21) Appl. No.: 13/049,666

(22) Filed: Mar. 16, 2011

(65) Prior Publication Data

US 2011/0230977 A1 Sep. 22, 2011

(30) Foreign Application Priority Data

Mar. 17, 2010 (JP) ................................ 2010-060862

(51) Int. Cl.
*G05B 11/01* (2006.01)
*F02M 37/04* (2006.01)
*G08C 19/12* (2006.01)

(52) U.S. Cl.
USPC ............... 700/78; 123/487; 341/187; 377/44; 377/49

(58) Field of Classification Search
USPC .......... 700/78; 123/487; 324/76.16; 341/187; 356/5.07-5.08; 377/44, 49, 52; 708/273
See application file for complete search history.

(56) References Cited

U.S. PATENT DOCUMENTS 4,829,457 A * 5/1989 Russo et al. .................. 700/293
5,365,183 A 11/1994 Mitsuhira
5,415,172 A * 5/1995 Tannaka et al. ............... 600/437
5,898,368 A * 4/1999 Handley et al. ............... 340/514
6,160,630 A 12/2000 Takayanagi
6,397,354 B1 * 5/2002 Ertekin ........................... 714/34
6,586,962 B2 * 7/2003 Sakurai et al. .................. 326/16
6,940,589 B1 * 9/2005 Suyama et al. ............... 356/213
7,417,952 B1 * 8/2008 Loc et al. ....................... 370/235
7,761,846 B2 * 7/2010 Hayles .......................... 717/109
8,144,675 B1 * 3/2012 Loc et al. ....................... 370/338
2002/0060328 A1 * 5/2002 Sakurai et al. ................ 257/200
2007/0044030 A1 * 2/2007 Hayles .......................... 715/762
2007/0052998 A1 3/2007 Tsunekawa

FOREIGN PATENT DOCUMENTS

JP S63-192927 A 8/1988
JP H02-165721 A 6/1990

(Continued)

OTHER PUBLICATIONS

Japanese Notification of Reasons for Refusal dated Oct. 29, 2013 issued in the corresponding Japanese Patent Application No. 2010-060862.

*Primary Examiner* — Ramesh Patel
(74) *Attorney, Agent, or Firm* — Buchanan Ingersoll & Rooney PC

(57) ABSTRACT

A control device for generating a second trigger with a delay of a predetermined time from generation of a first trigger, the control device having: a counter for counting numbers from 0 to n−1 at a frequency with cycles of a first period; a control section, which operates at a frequency with cycles of a second period that is longer than the first period, for calculating a remainder of a division by adding a number of counts of the counter corresponding to the predetermined time to a count value of the counter at the time of generation of the first trigger and by dividing a result of the addition by n; and an output section for outputting the second trigger at a time when the count value of the counter becomes equal to the remainder.

20 Claims, 15 Drawing Sheets

(56) References Cited

FOREIGN PATENT DOCUMENTS

| | | | |
|---|---|---|---|
| JP | H03-128529 | A | 5/1991 |
| JP | H04-122151 | A | 4/1992 |
| JP | H05-089261 | A | 4/1993 |
| JP | 10-322517 | A | 12/1998 |
| JP | 2000-242050 | A | 9/2000 |
| JP | 2004-279188 | A | 10/2004 |
| JP | 2005-096943 | A | 4/2005 |
| JP | 2007-069357 | A | 3/2007 |

* cited by examiner

F I G. 4

| INFORMATION SECTION | | COUNT VALUE STORING SECTION | | | | | | |
|---|---|---|---|---|---|---|---|---|
| ALREADY-READ FLAG | CHANGING DIRECTION | b6 | b5 | b4 | b3 | b2 | b1 | b0 |

F I G. 5

| INFORMATION SECTION | COUNT VALUE STORING SECTION | | | | | | |
|---|---|---|---|---|---|---|---|
| ALREADY-OUTPUTTED FLAG | b6 | b5 | b4 | b3 | b2 | b1 | b0 |

CONTROL APPARATUS AND IMAGE FORMING APPARATUS

This application is based on Japanese Patent Application No. 2010-060862 filed on Mar. 17, 2010, the content of which is herein incorporated by reference.

BACKGROUND OF THE INVENTION

1. Field of the Invention

The present invention relates to a control apparatus and an image forming apparatus, and particularly relates to a control apparatus and an image forming apparatus that generates a second trigger with a delay of a predetermined time from generation of a first trigger.

2. Description of Related Art

In paper carriage control in a conventional image forming apparatus, a CPU operates based on a constant frequency, and controls driving of a motor in response to an output from a sensor. Specifically, the CPU checks the sensor in every processing cycle, and when the output of the sensor changes, the CPU drives the motor after the elapse of a time equal to an integral multiple of the processing cycle.

Incidentally, in the conventional image forming apparatus, it is necessary to heighten the operation frequency of the CPU for the purpose of improving the accuracy of the paper carriage control. In this case, the use of a high-priced CPU is required, which leads to an increase in manufacturing cost of the image forming apparatus.

As an apparatus to perform control similar to the paper carriage control of the image forming apparatus, an image reader described in Japanese Patent Application Laid-Open No. 1110-322517 is known. In the image reader, a CPU generates phase switching data by interruption of a motor timer. A delay circuit counts a predetermined number by use of a counter, and thereafter outputs the phase switching data to a motor port. This allows the motor port to drive the motor with a delay of a predetermined time from the interruption of the motor timer.

However, in the image reader described in Japanese Patent Application Laid-Open Publication No. H10-322517, during counting of the predetermined number, a count value of the counter may exceed the countable upper limit of the counter. In this case, the image reader described in Japanese Patent Application Laid-Open No. H10-322517 cannot operate accurately.

SUMMARY OF THE INVENTION

An object of the present invention is to provide an image forming apparatus and a control apparatus that can be manufactured at low cost, while suppressing malfunctions.

According to an aspect of the present invention, a control device is to generate a second trigger with a delay of a predetermined time from generation of a first trigger, and the control device comprises: a counter for counting numbers from 0 to n−1 at a frequency with cycles of a first period; a control section, which operates at a frequency with cycles of a second period that is longer than the first period, for calculating a remainder of a division by adding a number of counts of the counter corresponding to the predetermined time to a count value of the counter at the time of generation of the first trigger and by dividing a result of the addition by n; and an output section for outputting the second trigger at a time when the count value of the counter becomes equal to the remainder.

According to another aspect of the present invention, a storage medium is stored with a control program to carry out a method for generating a second trigger with a delay of a predetermined time from generation of a first trigger, the method comprising the steps of counting numbers from 0 to n−1 at a frequency with cycles of a first period with a counter; calculating a remainder a division with a control section, which operates at a frequency with cycles of a second period that is longer than the first period, by adding a number of counts of the counter corresponding to the predetermined time to a count value of the counter at the time of generation of the first trigger and by dividing a result of the addition by n; and outputting the second trigger from an output section at a time when the count value of the counter becomes equal to the remainder.

BRIEF DESCRIPTION OF THE DRAWINGS

This and other objects and features of the present invention will be apparent from the following description with reference to the accompanying drawings, in which:

FIG. 4 is a configuration diagram of an inputted information register;

FIG. 5 is a configuration diagram of an outputted information register;

DETAILED DESCRIPTION OF THE PREFERRED EMBODIMENTS

Structure of Image Forming Apparatus

Figure 1:
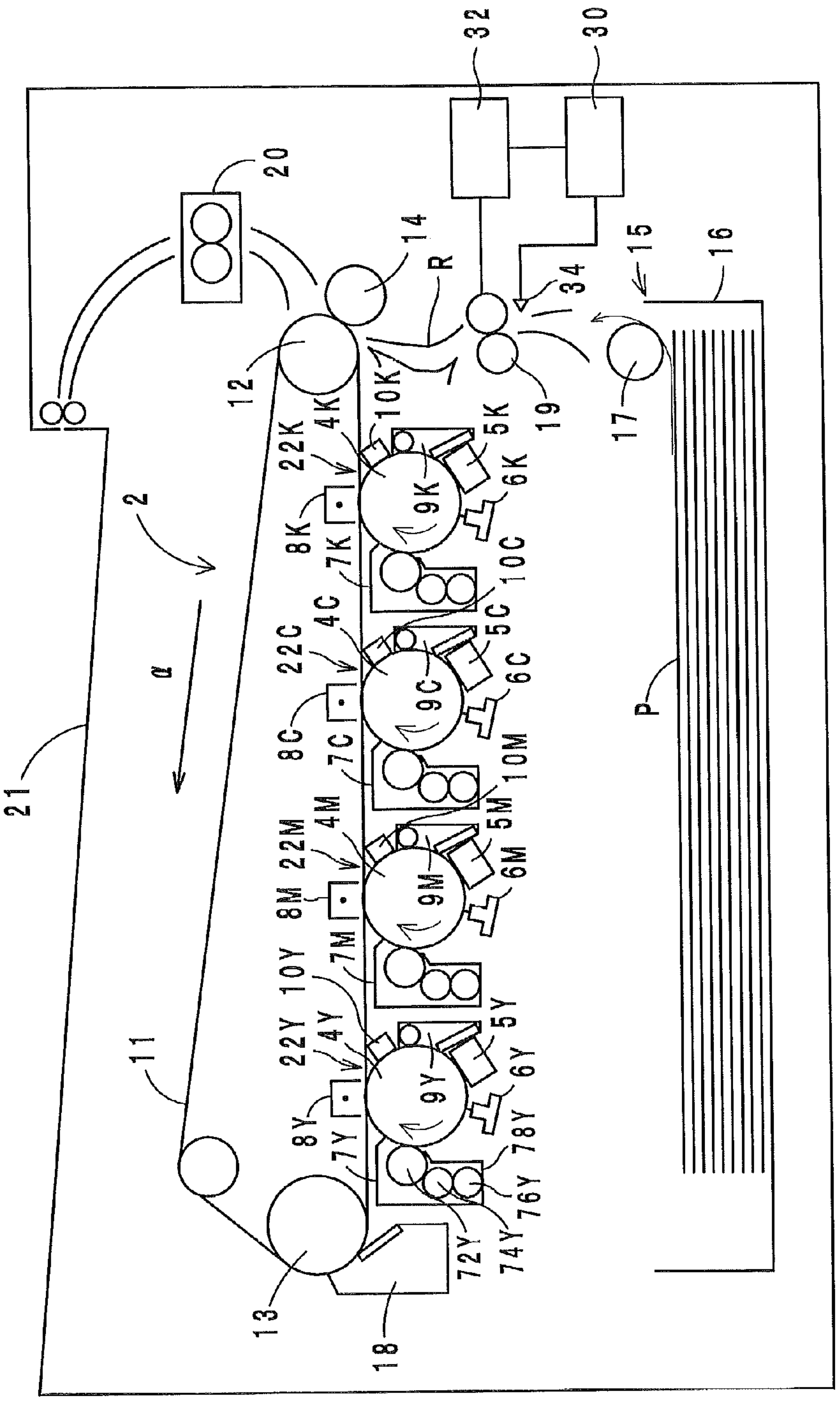
FIG. 1 is a view showing an overall structure of an image forming apparatus according to an embodiment of the present invention.

Hereinafter, an image forming apparatus according to an embodiment of the present invention is described with reference to the drawings. FIG. 1 is a view showing an overall structure of an image forming apparatus 1 according to the embodiment of the present invention.

The image forming apparatus 1 is an electrophotographic color printer of a tandem type, which is configured so as to synthesize an image of four colors, namely, Y (yellow), M (magenta), C (cyan) and K (black). The image forming apparatus 1 has a function of forming an image on paper (print medium) P based upon image data read by a scanner, and as shown in FIG. 1, the image forming apparatus 1 includes a printing section 2, a paper feeding section 15, a pair of timing rollers 19, a fixing unit 20, a paper discharge tray 21, a control section 30, a motor 32, and a sensor 34.

As shown in FIG. 1, the image forming apparatus 1 is provided with a carriage channel R for the paper P. The paper feeding section 15 is provided on the most upstream of the carriage channel R, serves to feed the paper P piece by piece, and includes a paper tray 16 and a paper feeding roller 17. A plurality of pieces of paper P to be subjected to printing are stacked and placed in the paper tray 16. The paper feeding roller 17 takes out the paper P, placed in the paper tray 16, one by one. The pair of timing rollers 19 is provided downstream from the paper feeding section 15 in the carriage channel R. the pair of timing rollers 19 delivers the paper P in the carriage channel R while adjusting the timing so that a toner image is transferred to the paper P in the printing section 2 (secondary transfer). The motor 32 drives the pair of timing rollers 19.

The printing section 2 is provided downstream from the pair of timing rollers 19 in the carriage channel R, and forms a toner image on the paper P carried from the pair of timing rollers 19. The printing section 2 includes an image forming section 22 (22Y, 22M, 22C, 22K), a transfer section 8 (8Y, 8M, 8C, 8K), an intermediate transfer belt (image carrier) 11, a driving roller 12, a driven roller 13, a secondary transfer roller (opposed member, transfer member) 14, and a cleaning unit 18. Further, the image forming section 22 (22Y, 22M, 22C, 22K) includes a photosensitive drum 4 (4Y, 4M, 4C, 4K), a charger 5 (5Y, 5M, 5C, 5K), an exposure unit 6 (6Y, 6M, 6C, 6K), a development unit 7 (7Y, 7M, 7C, 7K), a cleaner 9 (9Y, 9M, 9C, 9K), and an eraser 10 (10Y, 10M, 10C, 10K).

The charger 5 charges the peripheral surface of the photosensitive drum 4 with a negative potential.

The exposure unit 6 applies a laser beam by control of the control apparatus 30. A position irradiated with the laser beam gets a higher potential than a position not irradiated with the laser beam. Thereby, an electrostatic latent image is formed on the peripheral surface of the photosensitive drum 4.

As shown in FIG. 1, the development unit 7 (7Y, 7M, 7C, 7K) includes a development roller 72 (72Y, 72M, 72C, 72K), a feeding roller 74 (74Y, 74M, 74C, 74K), a stirring roller 76 (76Y, 76M, 76C, 76K), and a housing section 78 (78Y, 78M, 78C, 78K). In FIG. 1, for the sake of simplicity of the drawing, only the development roller 72Y, the feeding roller 74Y, the stirring roller 76Y, and the housing section 78Y of the development unit 7Y are provided with reference numerals.

The housing section 78 constitutes a body of the development unit 7, and houses the development roller 72, the feeding roller 74 and the stirring roller 76. Further, toner is stored in the housing section 78. The stirring roller 76 stirs the toner inside the housing section 78 to negatively charge the toner. The feeding roller 74 feeds the negatively charged toner to the development roller 72. The development roller 72 imparts the toner to the photosensitive drum 4. Specifically, a negative development bias voltage is applied to the development roller 72 to form a development field between the photosensitive drum 4 and the development roller 72. Since the toner is negatively charged, the toner moves from the development roller 72 to the photosensitive drum 4 under the influence of the development field. In the meantime, the potential of a portion not irradiated with a laser beam on the peripheral surface of the photosensitive drum 4 is lower than the potential of the development roller 72. On the other hand, a portion irradiated with the laser beam on the peripheral surface of the photosensitive drum 4 is higher than the potential of the development roller 72. Therefore, the toner adheres to the portion irradiated with the laser beam on the peripheral surface of the photosensitive drum 4. A toner image based upon the electrostatic latent image is thereby developed on the photosensitive drum 4.

The intermediate transfer belt 11 is extended between the driving roller 12 and the driven roller 13, and the toner image developed on the photosensitive drum 4 is transferred onto the intermediate transfer belt 11. The transfer section 8 is arranged so as to be opposed to the inner peripheral surface of the intermediate transfer belt 11. A primary transfer voltage is applied to the transfer section 8, and thereby, the toner image formed on the photosensitive drum 4 is transferred to the intermediate transfer belt 11 (primary transfer). The cleaner 9 serves to collect the toner remaining on the peripheral surface of the photosensitive drum 4 after the primary transfer. The eraser 10 neutralizes the charge on the peripheral surface of the photosensitive drum 4.

The driving roller 12 is rotated by an intermediate transfer belt driving section (not shown in FIG. 1) to drive the intermediate transfer belt 11 in a direction of an arrow $\alpha$. Thereby, the intermediate transfer belt 11 carries the toner image to the secondary transfer roller 14.

The secondary transfer roller 14, which is in the shape of a drum, is opposed to the intermediate transfer belt 11. A transfer voltage is applied to the secondary transfer roller 14, and the secondary transfer roller 14 is held at a predetermined transfer potential. Thereby, the toner image carried by the intermediate transfer belt 11 is transferred to the paper P passing between the intermediate transfer belt 11 and the secondary transfer roller 14 (secondary transfer). More specifically, the driving roller 12 is held in a ground potential. Moreover, the intermediate transfer belt 11 is in contact with the driving roller 12, and is thus held in a positive potential close to the ground potential. The transfer potential of the secondary transfer roller 14 is held to be higher than the potentials of the intermediate transfer belt 11 and the driving roller 12. Since the toner image is negatively charged, the toner image is transferred from the intermediate transfer belt 11 to the paper P through the electric field generated between the driving roller 12 and the secondary transfer roller 14.

The cleaning unit 18 removes the toner remaining on the intermediate transfer belt 11 after the secondary transfer of the toner image to the paper P.

The paper P with the toner image transferred thereto is carried to the fixing unit 20. The fixing unit 20 is provided downstream from the printing section 2 in the carriage channel R, and performs a heating treatment and a pressure treatment on the paper P, thereby fixing the toner image to the paper P. The paper discharge tray 21 is provided on the most downstream of the carriage channel R. The printed paper P is placed in the paper discharge tray 21.

The sensor 34 is provided in a predetermined position upstream from the pair of timing rollers 19 in the carriage channel R, and senses the paper P to output a sensing signal Sig1 to the control section 30. Specifically, the sensor 34 outputs a sensing signal Sig1 on a "High" level when the paper P is passing in front of the sensor 34. The sensor 34 outputs a sensing signal Sig1 on a "Low" level when the paper P is not passing in front of the sensor 34. Thereby, the control section 30 recognizes the leading edge of the paper P when the sensor 34 senses a rise of the sensing signal Sig1 from "Low" to "High", and recognizes the trailing edge of the paper P when the sensor 34 senses a fall of the sensing signal Sig1 from "High" to "Low".

First Embodiment

Configuration of Control Section

Figure 2:
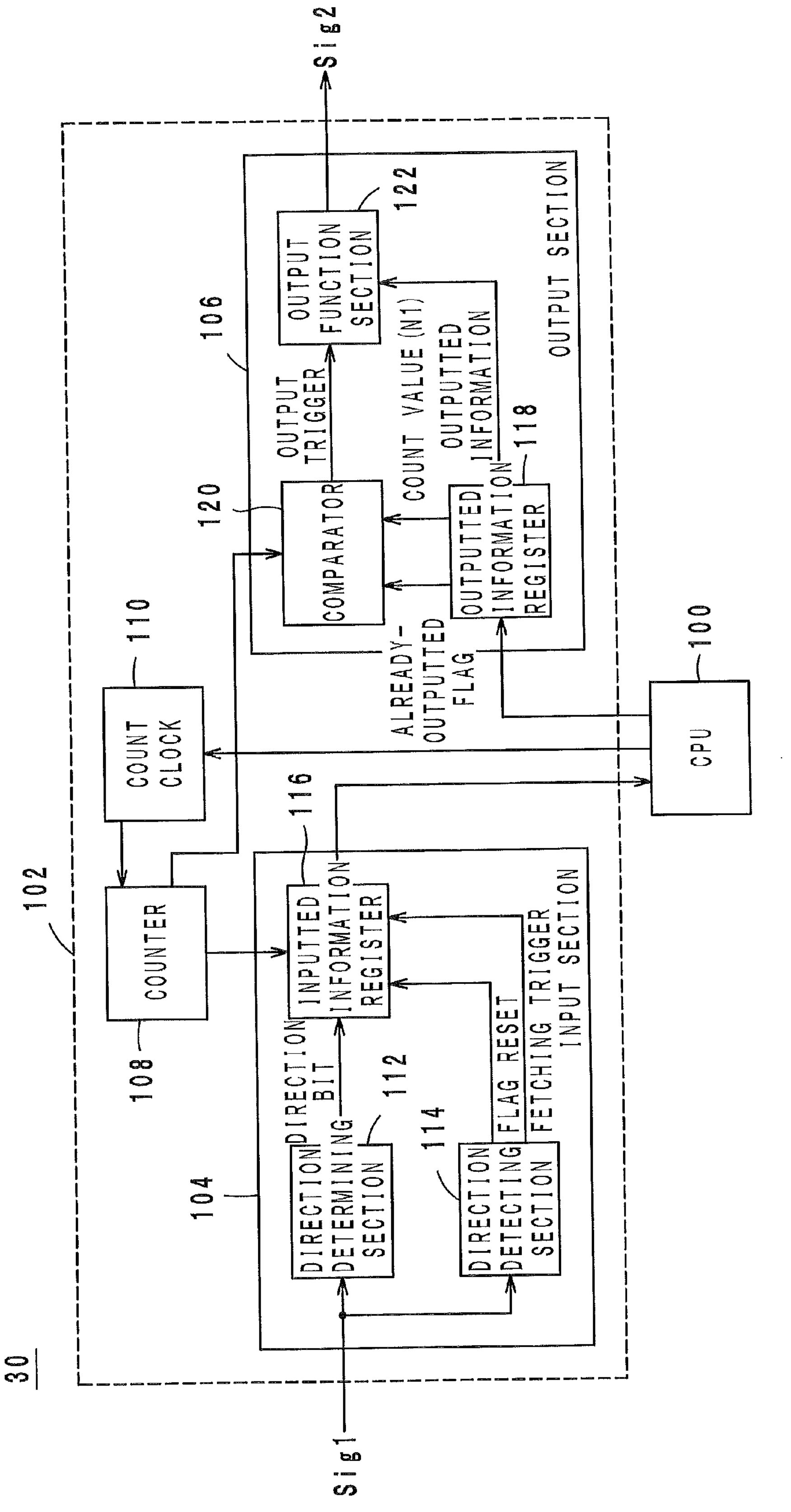
FIG. 2 is a block diagram of a control section of the image forming apparatus.
Figure 3:
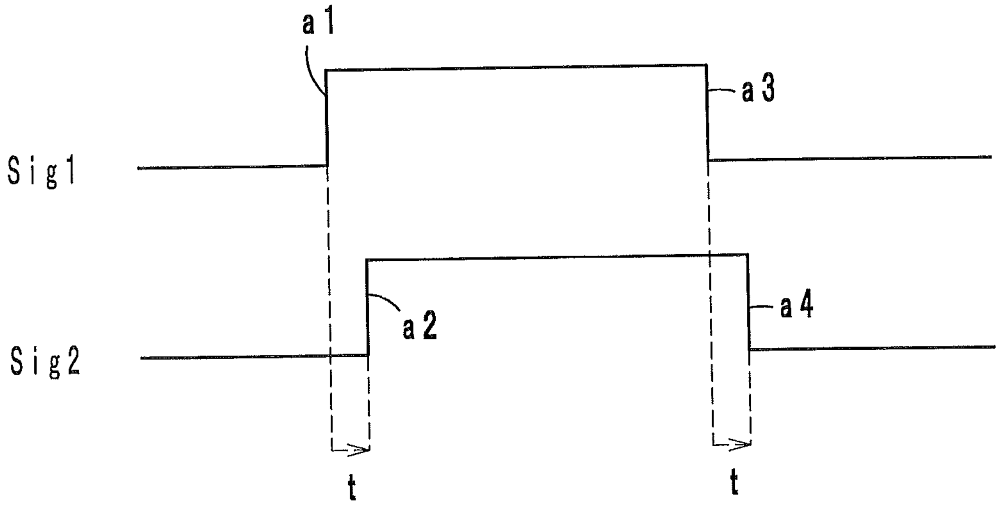
FIG. 3 is a diagram showing waveforms of a sensing signal Sig1 inputted to the control section and an output signal Sig2.

Next, the configuration of the control section 30 according to a first embodiment is described with reference to the drawings. FIG. 2 is a block diagram of the control section 30 of the image forming apparatus 1. FIG. 3 is a diagram showing a waveform of the sensing signal Sig1 inputted to the control section 30 and a waveform of an output signal Sig2 outputted from the control section 30.

As shown in FIG. 2, the control section 30 includes a CPU 100 and an integrated circuit 102. The control device 30 generates a rise (second trigger) a2 from "Low" to "High" in the output signal Sig2 with a delay of a time t from the rise (first trigger) from "Low" to "High" of the sensing signal Sig1 sent from the sensor 34. Thereby, in response to the arrival of the leading edge of the paper P at the pair of timing rollers 19, the control section 30 drives the motor 32 to rotate the pair of timing rollers 19 with a delay of the time t. The control section 30 generates a fall (second trigger) a4 from "High" to "Low" in the output signal Sig2 with a delay of the time t from the fall (first trigger) from "High" to "Low" of the sensing signal Sig1 sent from the sensor 34. Thereby, in response to the arrival of the trailing edge of the paper P at the pair of timing rollers 19, the control section 30 stops the drive of the motor 32 with a delay of the time t.

The integrated circuit 102 is, for example, configured by an internal circuit of an ASIC or a CPU, and made up of an input section 104, an output section 106, a counter 108, and a count clock 110. The counter 108 counts from 0 to n−1 at a constant frequency with cycles of a first period Tc. The count clock 110 supplies the counter 108 with a clock signal of the frequency with cycles of the first period Tc.

The input section 104 recognizes a rise a1 or a fall a3 of the sensing signal Sig1 as shown in FIG. 3, and stores a count value Ni of the counter 108 at the time of the rise a1 or the fall a3. Therefore, the input section 104 has a direction determining section 112, a direction detecting section 114, and an inputted information register 116. FIG. 4 is a configuration diagram of the inputted information register 116.

As shown in FIG. 4, the inputted information register 116 has an information section and a count value storing section. The inputted information register 116 stores the count value storing section with the count value Ni of the counter 108 at the time of the rise a1 or the fall a3 of the sensing signal Sig1. The count value storing section can store the count values Ni from 0 to 127 as 7-bit data of b0 to b6. Further, the inputted information register 116 has an already-read flag and a changing direction flag in the information section. The already-read flag indicates whether or not the count value Ni stored in the count value storing section has been read by the CPU 100. Specifically, the already-read flag is set to 1 when the count value Ni is read by the CPU 100, and set to 0 when a rise a1 or a fall a3 is recognized in the sensing signal Sig1. The changing direction flag indicates whether the change of the sensing signal Sig1 is a rise a1 or a fall a3. Specifically, the changing direction flag is set to 1 when the change is a rise a1, and set to 0 when the change is a fall a3.

When the direction determining section 112 recognizes a rise a1 of the sensing signal Sig1, the direction determining section 112 outputs a direction bit of 1 to the inputted information register 116. Thereby, the changing direction flag of the information section in the inputted information register 116 is set to 1. Also, when the direction determining section 112 recognizes a fall a3 of the sensing signal Sig1, the direction determining section 112 outputs a direction bit of 0 to the inputted information register 116. Thereby, the changing direction flag of the information section in the inputted information register 116 is set to 0.

When the direction detecting section 114 recognizes a rise a1 or a fall a3 of the sensing signal Sig1, the direction detecting section 114 outputs a fetching trigger to the inputted information register 116 so as to make the inputted information register 116 fetch the count value Ni of the counter 108. Thereby, the count value Ni of the counter 108 is stored into the count value storing section in the inputted information register 116. Further, when the direction detecting section 114 recognizes a rise a1 or a fall a3 of the sensing signal Sig1, the direction detecting section 114 outputs a flag reset to the inputted information register 116 so as to reset the already-read flag. The already-read flag of the inputted information register 116 is thereby set to 0.

The CPU 100 operates at a constant frequency with cycles of a second period Tr that is longer than the first period Tc of the operating frequency of the counter 108. The CPU 100 calculates a value N0 by adding the number of counts Nd (=t/Tc) of the counter 108, which corresponds to the time t, to the count value Ni stored in the inputted information register 116. The value N0 is to show the count value of the counter 108 when the time t has elapsed since the rise a1 or the fall a3. However, the value N0 may exceed the maximum number Nu (n in the present embodiment) that can be indicated by the counter 108. Therefore, the CPU 100 performs a division of the value N0 by the maximum number Nu (=n), and the remainder N1 (=N0 mod Nu) of the division is figured out. This allows the CPU 100 to calculate a count value (N1) that shall be indicated by the counter 108 when the time t has elapsed since the rise a1 or the fall a3.

However, only with the calculation of the remainder N1 by the CPU 100, it remains unclear how many turns the counter 108 has made before the counter 108 indicates the remainder N1 since the rise a1 or the fall a3 till the elapse of the time t therefrom. Therefore, the CPU 100 calculates a difference Nv (=Nd−Nu) between the number of counts Nd corresponding to the time t and the maximum countable number Nu of the counter 108. When the difference Nv is negative, the CPU 100 determines that the time t elapses from the generation of the rise a1 or the fall a3 before the counter 108 makes one turn. That is, the time when the count value of the counter 108 becomes equal to the remainder N1 for the first time is the time when the time t has elapsed since the rise a1 or the fall a3. On the other hand, when the difference Nv is positive, the CPU 100 determines that the time t elapses from the generation of the rise a1 or the fall a3 after the counter 108 makes one or more turns. Therefore, the CPU 100 calculates an integral value M by dividing the difference Nv by the number of counts Nr of the counter 108 corresponding to the second period Tr and by rounding up the quotient of the division to unit. The CPU 100 then outputs information of the remainder N1 to the output section 106 after the elapse of M cycles of the CPU 100 from the rise a1 or the fall a3 of the sensing signal Sig1.

Now, the reason why the CPU 100 outputs the information of the remainder N1 after the elapse of M cycles is described in detail. When the difference Nv is positive, the time t elapses from the generation of the rise a1 or the fall a3 after the counter 108 makes one or more turns. In this case, while the counter 108 is counting the time t, the counter 108 indicates a value equal to the remainder N1 a plurality of times. Among the plurality of times when the counter 108 indicates the value equal to the remainder Nr, however, only when the counter 108 indicates the value equal to the remainder N1 for the last time, it means that the time t has elapsed since the rise a1 or the fall a3. Hence the CPU 100 is only required to output the information of the remainder N1 to the output section 106 after the count value of the counter 108 becomes equal to the remainder N1 second to last.

When the counter 108 has counted a number equal to the difference Nv since the rise a1 or the fall a3, the counter 108 indicates the value equal to the remainder N1 second to last. As mentioned, the CPU 100 operates at a constant frequency with cycles of the second period Tr, which corresponds to the number of counts Nr of the counter 108. Therefore, in order to calculate a stand-by time of the CPU 100 that permits the CPU 100 to output the information of the remainder Nr after the count of the number equal to the difference Nv of the counter 108, a value M is obtained by rounding up the quotient of a division of the difference Nv by the number of counts Nr. Then, after the stand-by time, that is, after the elapse of M cycles from the generation of the rise a1 or the fall a3 of the sensing signal Sig1, the CPU 100 outputs the information of the remainder Nr.

The output section 106 stores the remainder N1 calculated by the CPU 100, and generates a rise a2 or a fall a4 in the output signal Sig2 when the count value of the counter 108 becomes equal to the remainder N1. The output section 106 has an outputted information register 118, a comparator 120, and an output function section 122. FIG. 5 is a configuration diagram of the outputted information register 118.

The outputted information register 118 has an information section and a count value storing section, as shown in FIG. 5. The outputted information register 118 stores the remainder N1 calculated by the CPU 100 in the count value storing section. The count value storing section can store the count values Ni from 0 to 127 as 7-bit data of b0 to b6. Further, the outputted information register 118 has an output flag in the information section. The output flag indicates whether the rise a2 or the fall a4 has been generated in the output signal Sig2. Specifically, the output flag is set to 1 when the rise a2 or the fall a4 is generated in the output signal Sig2, and the output flag is set to 0 when the information of the remainder N1 is outputted from the CPU 100.

The comparator 120 outputs an output trigger to the output function section 122 while the output flag is 0 and when the count value of the counter 108 becomes equal to the remainder N1 stored in the outputted information register 118. When the output trigger is outputted from the comparator 120, the output function section 122 generates the rise a2 or the fall a4 in the output signal Sig2 based upon output information from the outputted information register 118.

Exemplary Operation of Control Section

Next, an example of the operation of the control section 30 according to the first embodiment is described. Table 1 shows conditions for the CPU 100 and the counter 108. Table 2 shows set values of the parameters for operation of the control section 30.

TABLE 1

| | |
|---|---|
| Tc | 0.100 ms |
| Nu | 110 (0-109) |
| Tr | 5.000 ms |
| Nr | 50 |

TABLE 2

| | |
|---|---|
| T | 33.000 ms |
| Nd | 330 |
| Ni | 80 |
| N0 | 410 |
| Nv | 220 |
| M | 5 |
| N1 | 80 |

As shown in Table 2, the time t is 33 ms. In this case, the number of counts Nd of the counter 108 corresponding to the time t is 330. The count value Ni of the counter 108 at the time of sensing the rise a1 or the fall a3 of the sensing signal Sig1 is 80. Therefore, the count value N0 of the counter 108 after the elapse of the time t from the rise a1 or the fall a3 is supposed to be 410.

However, since the maximum countable value of the counter 108 is 110, the time t cannot be timed while the counter 108 makes one turn. Therefore, 410 (=N0) is divided by 110 (=Nu), and the remainder is calculated to be 80 (=N1). Thereby, it is figured out that the count value of the counter 108 after the elapse of the time t from the rise a1 or the fall a3 shall be 80.

However, as described above, the counter 108 makes a plurality of turns (three turns) before the elapse of the time t. If the CPU 100 outputs information of the remainder of 80 to the output section 106 immediately after the calculation of the remainder, the comparator 120 will determine that the time t has elapsed when the count value of the counter 108 becomes 80 for the first time.

In order to prevent this error, the CPU 100 performs calculation described below. In this example, the number of counts Nd of the counter 108 corresponding to 33 ms (=t) is 330, and the maximum count value Nu of the counter 108 is 110. Therefore, the number Nd to be counted by the counter 108 is larger than the maximum countable value Nu by 220 (=Nv). This means that the count value of the counter 108 will be 80 (=N1) second to last when the counter 108 has counted 220 (=Nv) since the rise a1 or the fall a3. Therefore, the CPU 100 is required to wait to output the information of the remainder of 80 (=N1) to the output section 106 until the counter 108 finishes counting 220 (=Nv).

However, since the CPU 100 operates at a constant frequency with cycles of a second period of 5 ms (=Tr), which is different from the first period of 0.1 ms (=Tc) of the operating frequency of the counter 108, it is not impossible for the CPU 100 to stand by exactly for the length of time equal to 220 counts of the counter 108. Therefore, the number of cycles of the CPU 100 that is close to the time length equal to 220 counts of the counter 108 is calculated.

The second period of 5 ms (=Tr) corresponds to 50 counts (=Nr) of the counter 108. When 220 (=Nv) is divided by 50 (=Nr), the quotient is 4.4, which means the CPU 100 should stand by for 4.4 cycles. However, the CPU 100 cannot stand by for 4.4 cycles since the CPU 100 operates on the basis of an integral number of cycles. Therefore, 4.4 is rounded up to unit, and a value 5 (=M) is obtained. Thus, the CPU 100 outputs the value 80 (=N1) to the output section 106 after standing by for 5 cycles. Then, the CPU 100 resets the output flag shown in FIG. 5 to 0. Subsequently, the comparator 120 outputs an output trigger to the output function section 122 when the count value of the counter 108 becomes 80. This leads to generation of the rise a2 or the fall a4 in the output signal Sig2.

Operation of Image Forming Apparatus

Figure 6:
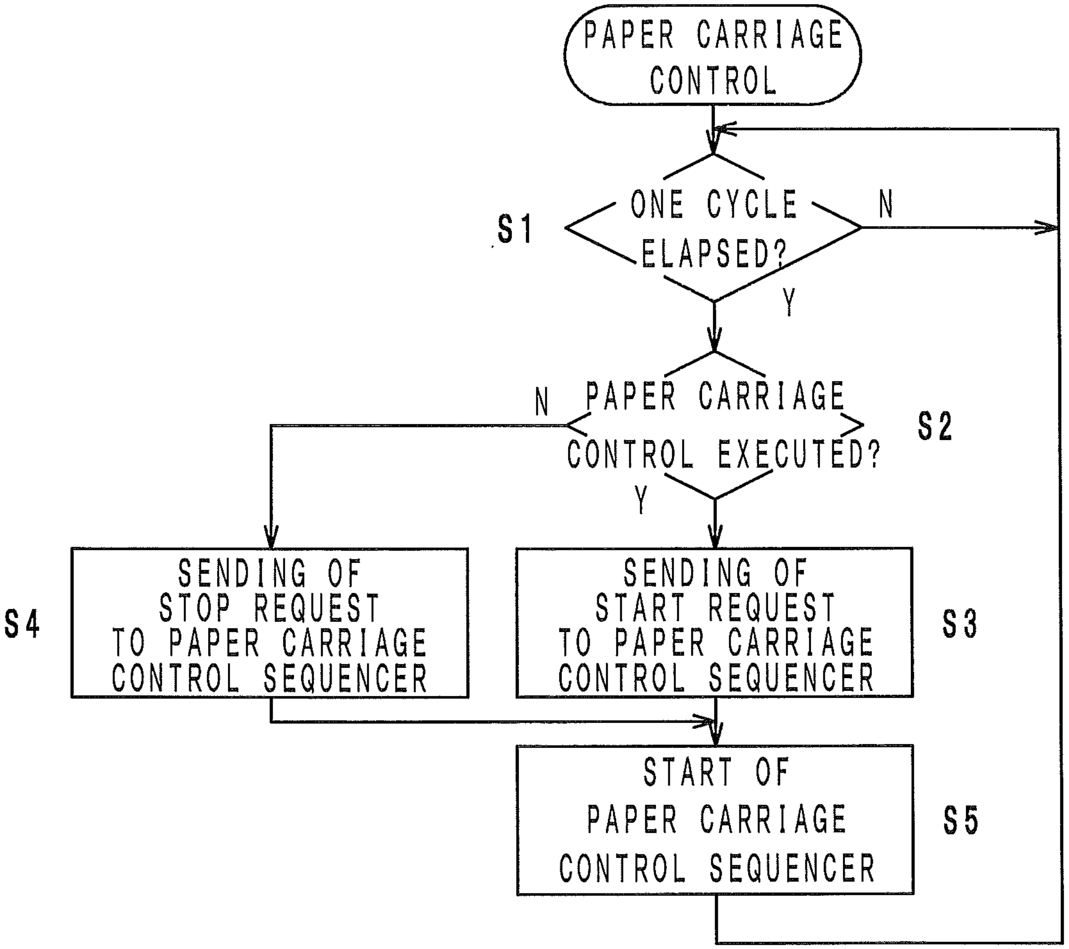
FIG. 6 is a flowchart showing an operation performed by a CPU for paper carriage control.
Figure 7:
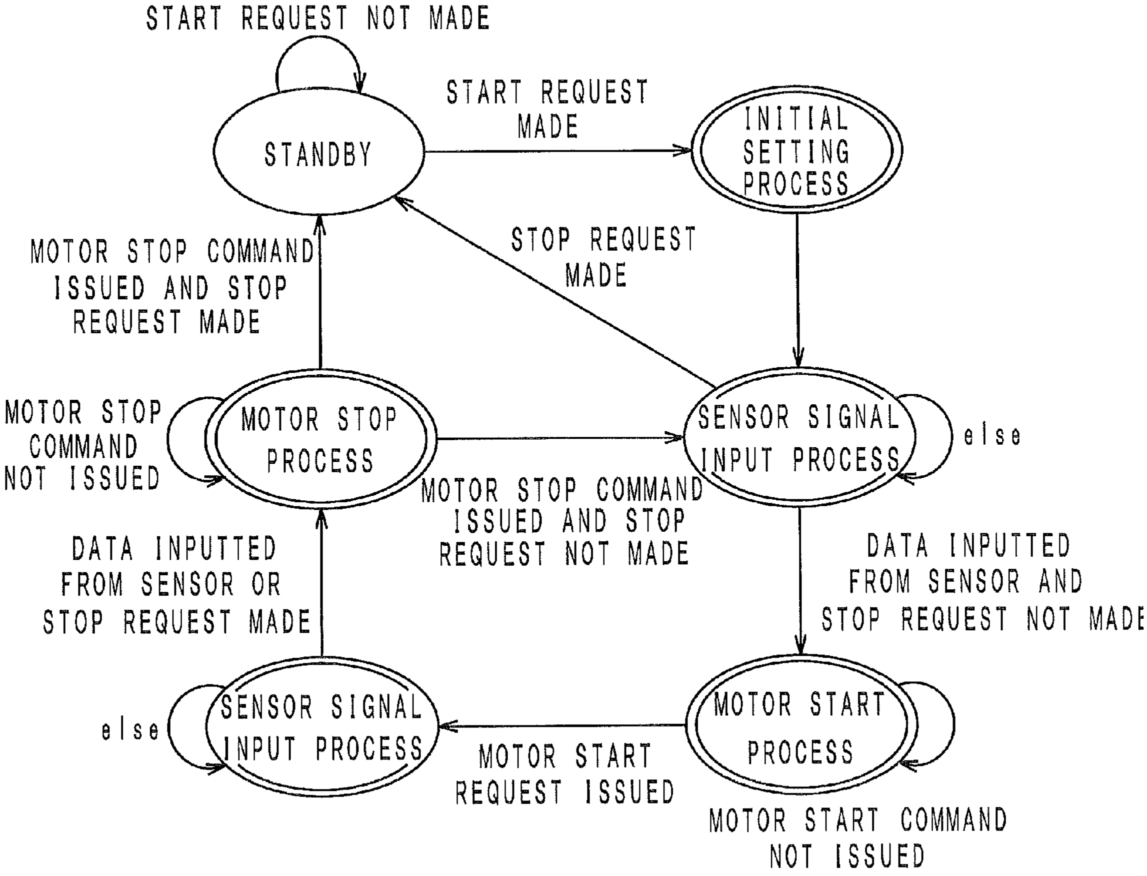
FIG. 7 is a state transition diagram of the CPU during the paper carriage control.
Figure 8:
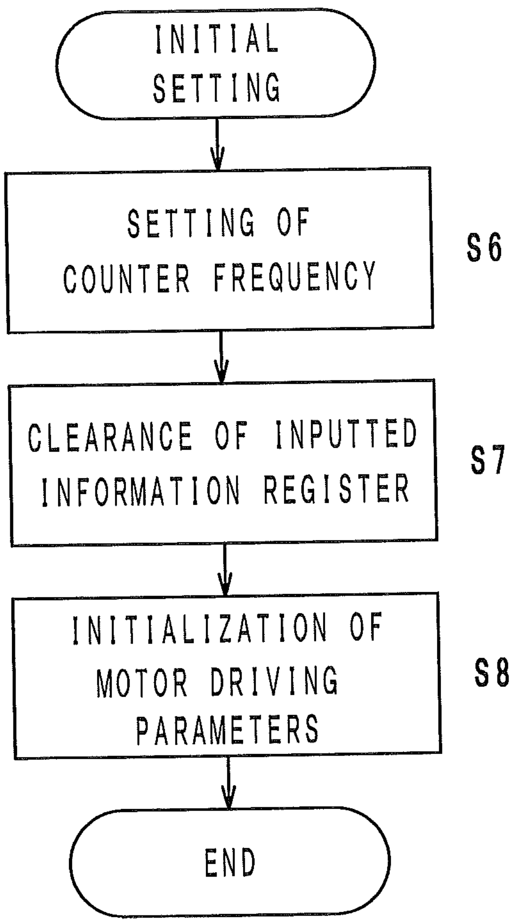
FIG. 8 is a flowchart showing an operation performed by the CPU for an initial setting process shown in FIG. 7.
Figure 9:
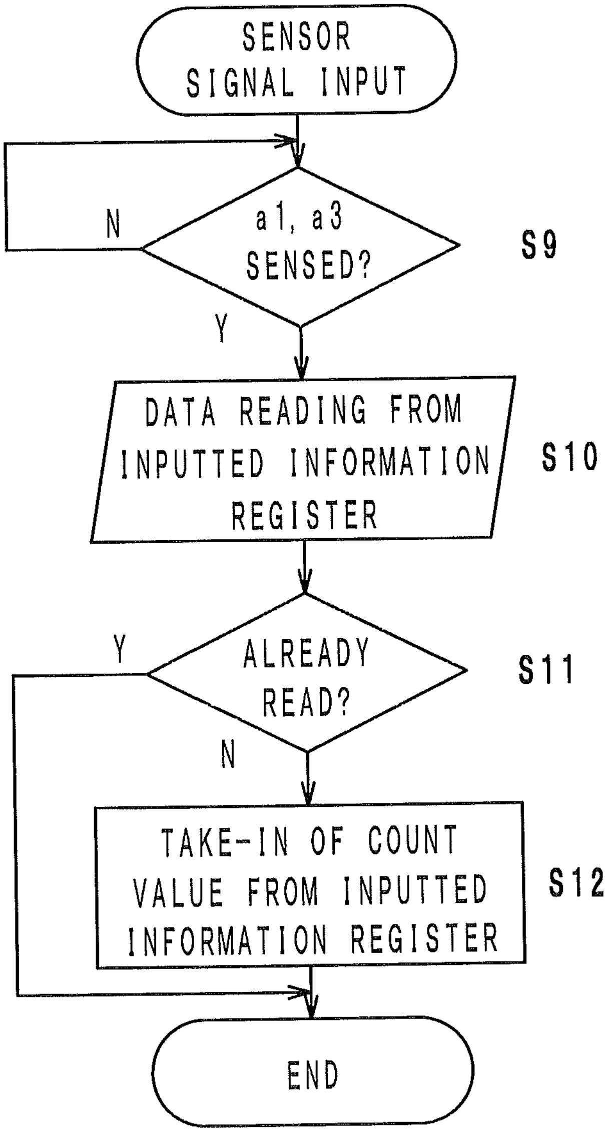
FIG. 9 is a flowchart showing an operation performed by the CPU for a sensor signal input process shown in FIG. 7.
Figure 10:
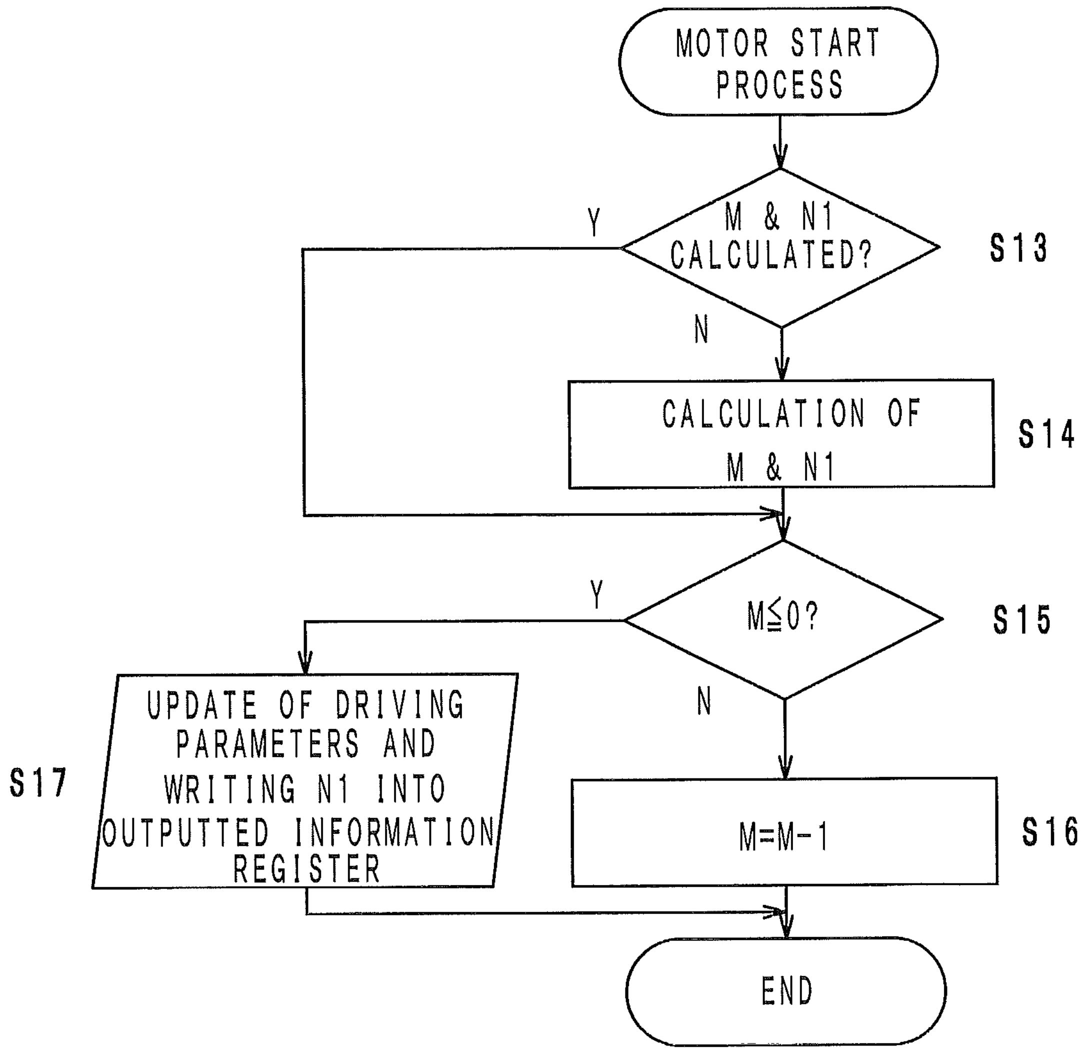
FIG. 10 is a flowchart showing an operation performed by the CPU for a motor start process shown in FIG. 7.
Figure 11:
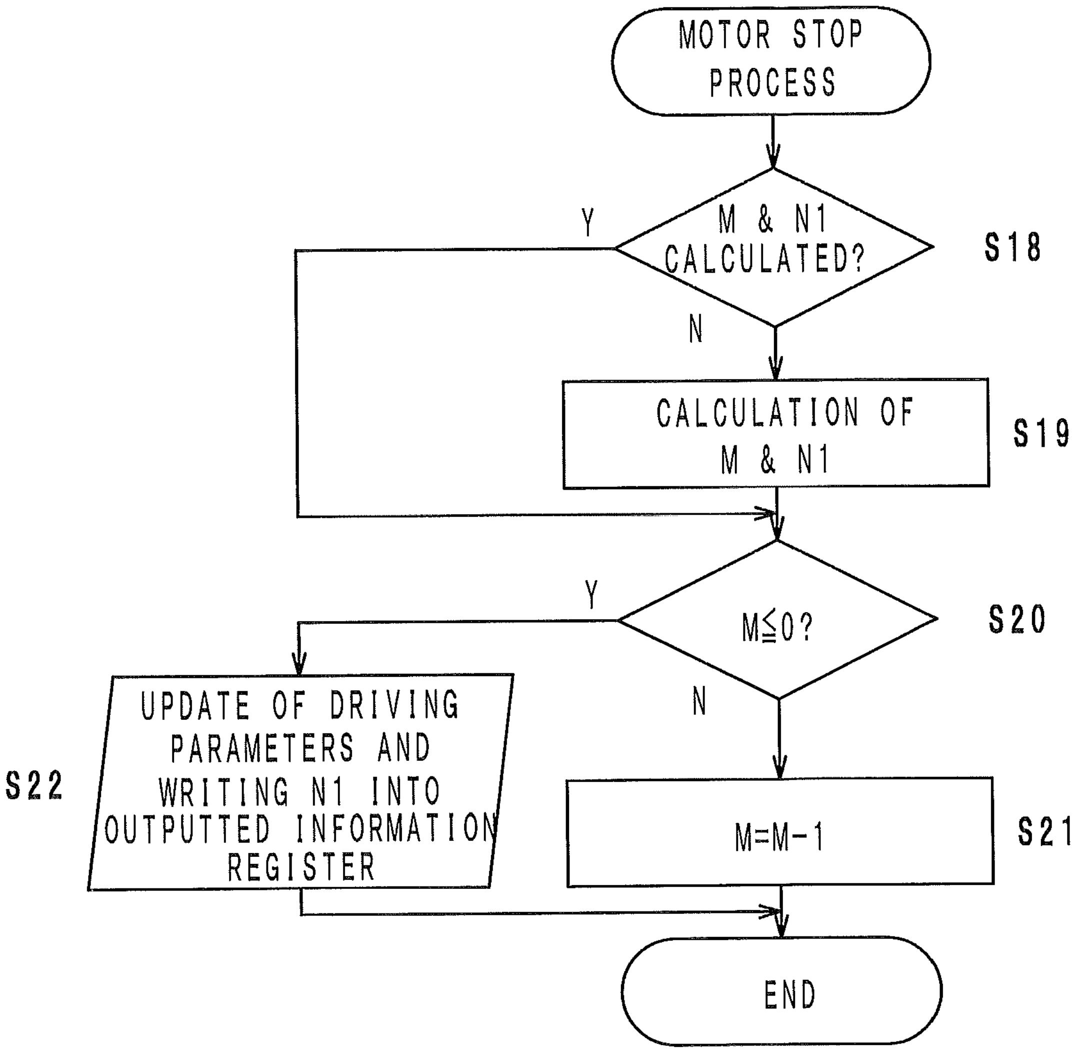
FIG. 11 is a flowchart showing an operation performed by the CPU for a motor stop process shown in FIG. 7.

Next, the operation of the image forming apparatus 1 having the control section 30 according to the first embodiment is described. Hereinafter, paper carriage control to carry the paper P in the image forming apparatus 1 is described. FIG. 6 is a flowchart showing a procedure performed by the CPU 100 for the paper carriage control. FIG. 7 shows state transitions of the CPU 100 during the paper carriage control. FIG. 8 is a flowchart showing a procedure performed by the CPU 100 for an initial setting process shown in FIG. 7. FIG. 9 is a flowchart showing a procedure performed by the CPU 100 for a sensor signal input process shown in FIG. 7. FIG. 10 is a flowchart showing a procedure performed by the CPU 100 for a motor start process shown in FIG. 7. FIG. 11 is a flowchart showing a procedure performed by the CPU 100 for a motor stop process shown in FIG. 7.

First, as shown in FIG. 6, the CPU 100 determines whether or not the time corresponding to one cycle has elapsed (step S1). When the time corresponding to one cycle has not elapsed, the process returns to step S1. When the time corresponding to one cycle has elapsed, the process goes to step S2.

Next, the CPU 100 determines whether or not to execute the paper carriage control (step S2). When the paper carriage control is to be executed, the process goes to step S3. On the other hand, when the paper carriage control is not to be executed, the process goes to step S4.

When the paper carriage control is to be executed, the CPU 100 makes a starting request to a paper carriage control sequencer (step S3). The process then goes to step S5.

When the paper carriage control is not to be executed, the CPU 100 makes a stop request to the paper carriage control sequencer (step S4). The process then goes to step S5.

At step S5, the CPU 100 activates the paper carriage control sequencer (step S5). The process then returns to step S1.

Herein, the paper carriage control sequencer is described with reference to FIG. 7. First, the CPU 100 is in a standby state as shown in FIG. 7. In the standby state, the CPU 100 stands by while repeatedly determining whether or not a start request has been made. When the start request is made at step S3 of FIG. 6, the CPU 100 shifts to an initial setting process. The initial setting process is described with reference to FIG. 8

In the initial setting process, in order to set the first period Tc for the operating frequency of the counter 108, the CPU 100 sets the period of a clock signal generated by the count clock 110 to the first period Tc (step S6). Further, the CPU 100 clears the inputted information register 116 (step S7).

The CPU 100 initializes motor driving parameters, such as a current value for driving the motor 32, set in the CPU 100 (step S8). With this, the initial setting process is completed.

Upon completion of the initial setting process, the CPU 100 shifts to a sensor signal input process. The sensor signal input process is described with reference to FIG. 9. In the sensor signal input process, the rise a1 of the sensing signal Sig1 is sensed.

In the sensor signal input process, as shown in FIG. 7, the CPU 100 stands by while repeatedly determining whether or not the stop request (step S4 of FIG. 6) has been made to the paper carriage control sequencer. When the stop request has been made to the paper carriage control sequencer, the CPU 100 shifts to the standby state.

On the other hand, when the stop request has not been made to the paper carriage control sequencer, the CPU 100 determines whether or not the rise a1 of the sensing signal Sig1 sent from the sensor 34 has been sensed (step S9). At step S9, the CPU 100 determines whether or not the sensor 34 has sensed the leading edge of the paper P. When the rise a1 has been sensed, the process goes to step S10. When the rise a1 has not been sensed, the process stays at step S9.

When the rise a1 has been sensed, the CPU 100 reads data from the inputted information register 116 shown by FIG. 4 (step S10). At this time, the CPU 100 checks the already-read flag. The CPU 100 then determines whether or not the inputted information register 116 has already been read (step S11) based on whether or not the already-read flag is 1. When data reading from the inputted information register 116 has been done, the process is completed. When data reading from the inputted information register 116 has not been done, the process goes to step S12.

When data reading from the inputted information register 116 has not been done, the CPU 100 obtains a count value of the inputted information register 116 (step S12). With this, the sensor signal input process is completed. The CPU 100 then shifts to a motor start process.

Next, the motor start process is described with reference to FIG. 10. The CPU 100 determines whether or not the value M and the remainder N1 have been calculated (step S13). When the calculations have been made, the process goes to step S15. When the calculations have not been made, the process goes to step S14.

When the calculations have not been made, the CPU 100 calculates the value M and the remainder N1 (step S14). Since the calculations of the value M and the remainder N1 have already been described, detailed descriptions thereof are omitted here. The process then goes to step S15.

At step S15, the CPU 100 determines whether or not the value M is 0 or smaller (step S15). At step S15, the CPU 100 determines whether or not to immediately output the remainder N1 to the output section 106 based on whether or not the value M is 0 or smaller. When the value M is not 0 or smaller, the process goes to step S16. On the other hand, when the value M is 0 or smaller, the process goes to step S17.

When the value M is not 0 or smaller, the CPU 100 reduces the value M by one (step S16). At step S16, the CPU 100 waits to output the remainder N1 to the output section 106. The process is then completed.

When the value M is 0 or smaller, the CPU 100 writes the remainder N1 into the count value storing section in the outputted information register 118, while writing a starting parameter into the outputted information register 118 (step S17). Thereafter, in the output section 106, the rise a2 of the output signal Sig2 is generated based upon the count value of the counter 108 and the value M written in the outputted information register 118. That is, a motor starting command is issued. The process is then completed.

In the motor start process, when the motor starting command is issued, the CPU 100 sifts to the sensor signal input process. In the sensor signal input process, the fall a3 of the sensing signal Sig1, that is, the trailing edge of the paper P is sensed.

In the sensor signal input process, as shown in FIG. 7, the CPU 100 stands by while repeatedly determining whether or not the stop request (step S6 of FIG. 6) has been made to the paper carriage control sequencer. When the stop request has been made to the paper carriage control sequencer, the CPU 100 starts the sensor signal input process.

First, as shown in FIG. 9, the CPU 100 determines whether or not the fall a3 of the sensing signal Sig1 of the sensor 34 has been sensed (step S9). At step S9, the CPU 100 determines whether or not the sensor 34 has sensed the trailing edge of the paper P. When the fall a3 has been sensed, the process goes to step S10. When the fall a3 has not been sensed, the process returns to step S9.

When the fall a3 has been sensed, the CPU 100 reads data from the inputted information register 116 shown by FIG. 4 (step S10). At this time, the CPU 100 checks the already-read flag. The CPU 100 checks whether or not the already-read flag is 1 to determine whether or not data reading from the inputted information register 116 has already been executed (step S11). When data reading from the inputted information register 116 has been executed, the process is completed. When data reading from the inputted information register 116 has not been executed, the process goes to step S12.

When data reading from the inputted information register 116 has not been executed, the CPU 100 obtains a count value of the inputted information register 116 (step S12). With this, the sensor signal input process is completed. The CPU 100 then shifts to a motor stop process.

Next, the motor stop process is described with reference to FIG. 11. The CPU 100 determines whether or not the value M and the remainder N1 have been calculated (step S18). When the calculations have been made, the process goes to step S20. When the calculations have not been made, the process goes to step S19.

When the calculations have not been made, the CPU 100 calculates the value M and the remainder N1 (step S19). Since the calculations of the value M and the remainder N1 have been described above, detailed descriptions thereof are omitted here. The process then goes to step S20.

At step S20, the CPU 100 determines whether or not the value M is 0 or smaller (step S20). At step S20, the CPU 100 determines whether or not to immediately output the remainder N1 to the output section 106 based on whether or not the value M is 0 or smaller. When the value M is not 0 or smaller, the process goes to step S21. On the other hand, when the value M is 0 or smaller, the process goes to step S22.

When the value M is not 0 or smaller, the CPU 100 reduces the value M by one (step S21). At step S21, the CPU 100 waits to output the remainder N1 to the output section 106. The process is then completed.

When the value M is 0 or smaller, the CPU 100 writes the value M into the count value storing section in the outputted information register 118, while writing the starting parameter into the outputted information register 118 (step S22). Thereafter, in the output section 106, the fall a4 of the output signal Sig2 is generated based upon the count value of the counter 108 and the value M written in the outputted information register 118. That is, a motor stopping command is issued. The process is then completed.

In the motor stop process, when the motor stopping command is issued and the stop request is not made to the paper carriage control sequencer, the CPU 100 shifts to the sensor signal input process. On the other hand, in the motor stop process, when the motor stopping command is issued and the stop request is made to the paper carriage control sequencer, the CPU 100 shifts to the standby state. In this way, the image forming apparatus 1 is operated.

Effect

The image forming apparatus 1 as described above can be manufactured at low cost. More specifically, in the image forming apparatus 1, timing of the time t is executed by the counter 108, the input section 104 and the output section 106, and the CPU 100 reads and writes the count value to control the counter 108, the input section 104 and the output section 106. The period of the cycles for the count value reading/writing may be long as compared with the period of the cycles for the counting by the counter 108. Hence, the CPU 100 operates at the frequency with cycles of the second period Tr, and the counter 108 operates at the frequency with cycles of the first period Tc that is shorter than the second period Tr. More specifically, in the image forming apparatus 1, as the CPU 100, which is relatively a high-priced component, one that operates at a frequency with cycles of a relatively long period (second period Tr) is used, and as the counter 108, which is relatively a low-priced component, one that operates at a frequency with cycles of a relatively short period (first period Tc) is used. This eliminates the need for using a high-priced component as the CPU 100 for the purpose of accurate measurement of the time t, which enables manufacturing of the image forming apparatus 1 at low cost.

Further, malfunction of the image forming apparatus 1 can be suppressed. More specifically, in the image forming apparatus 1, when the counter 108 makes one or more turns during the timing of the time t, the CPU 100 waits for the period of M cycles to output the information of the remainder N1 to the output section 106. Here, that the counter 108 makes one or more turns during the timing of the time t means that the time t elapses from the generation of the rise a1 or the fall a3 after the counter 108 makes one or more turns. In this case, the count value of the counter 108 becomes equal to the remainder N1 a plurality of times during the timing of the time t, but when the count value of the counter 108 becomes equal to the remainder N1 for the last time, it indicates the elapse of the time t from the generation of the rise a1 or the fall a3. Hence, the CPU 100 needs to output the remainder N1 after the count value of the counter 108 becomes equal to the remainder N1 second to last.

The count value of the counter 108 becomes equal to the remainder N1 second to last when the counter 108 has counted the number corresponding to the difference Nv (Nd−Nu) since the generation of the rise a1 or the fall a3. The CPU 100 operates at the frequency with cycles of the period Tr that corresponds to the number of counts Nr of the counter 108. For this reason, in order to wait for a time longer than the counting time of the number corresponding to the difference Nv, the CPU 100 needs to calculate a value M by dividing by the difference Nv by the number of counts Nr and by rounding up the quotient to unit, and needs to output the remainder N1 after the elapse of M cycles from the generation of the rise a1 or the fall a3 of the sensing signal Sig1. This enables the comparator 120 to read the count value from the outputted information register 118 at an accurate time. This consequently suppresses malfunction of the image forming apparatus 1.

Second Embodiment

Configuration of Control Section

Next, the configuration of the control section 30 according to a second embodiment is described. The control section 30 according to the second embodiment has the same components as the control section 30 according to the first embodiment as shown by FIG. 2. The control section 30 according to the second embodiment is different from the control section 30 according to the first embodiment in the operation of the CPU 100 at the time of waiting for the period of M cycles. Hereinafter, the difference is described.

In the control section 30 according to the first embodiment, the CPU 100 operates at the constant frequency with cycles of the second period Tr. However, in the CPU 100, the second period Tr may fluctuate depending upon its operating state. In this case, even when the CPU 100 waits for the period of M cycles to output the remainder N1 after the generation of the rise a1 or the fall a3, the counter 108 might not count the number corresponding to the difference Nv. On the contrary, the counter 108 might have counted the number Nd corresponding to the time t.

Therefore, in the control section 30 according to the second embodiment, the CPU 100 performs an operation described below when the difference Nv between the number of counts Nd to be counted by the counter 108 to time the time t and the maximum countable value Nu (=n) is positive (that is, when the counter 108 makes one or more turns during the time t). Specifically, the CPU 100 decreases the difference Nv by the number Nk counted by the counter 108 for the period of each cycle. Then, in a cycle where the difference Nv becomes negative, the CPU 100 outputs the remainder N1 to the output section 106. A more detailed description is given below.

In the control section 30 according to the second embodiment, the CPU 100 operates in the same way as the CPU 100 in the control section 30 according to the first embodiment until it calculates the difference Nv. When the calculated difference Nv is negative, it means that the counter 108 will count the number corresponding to the difference Nv before making one turn. Therefore, the CPU 100 immediately outputs the remainder N1 to the output section 106. In this case, the control section 30 according to the second embodiment is operated by the CPU in the same way as the control section 30 according to the first embodiment. Hence, a further description is omitted.

On the other hand, when the calculated difference Nv is positive, it means that the counter 108 will count the number corresponding to the difference Nv after making one or more turns. Therefore, the CPU 100 needs to wait to output the remainder N1 to the output section 106.

First, the CPU 100 takes in the current count value of the counter 108 as a value Nj.

Next, at the end of one cycle, the CPU 100 takes in the value Nj at the end of the previous cycle as a value Nj0, and takes in a current count value of the counter 108 as a new value Nj. The CPU 100 takes in the new value Nj as a value Nj1.

Next, the CPU 100 calculates the number Nk counted by the counter 108 during the present cycle from the values Nj0 and Nj1. Specifically, the CPU 100 calculates a difference between the values Nj1 and Nj0, and takes in this difference as the number Nk counted by the counter 108 during the present step. However, there are some cases where the count value of the counter 108 may exceed the maximum countable value Nu during the count of one cycle. In this case, the difference between the values Nj1 and Nj0 (Nj1 minus Nj0) is negative. When the difference between the values Nj1 and Nj0 is negative, the CPU 100 adds the maximum counter value Nu to the difference between the values Nj1 and Nj0, and thereby, the number Nk is calculated as (Nj1−Nj0+Nu).

Next, the CPU 100 subtracts the number Nk from the difference Nv to calculate a new difference Nv. The CPU 100 then determines whether or not the difference Nv has become negative. When the difference Nv has become negative, the CPU 100 determines that the counter 108 has counted a number that is equal to or greater than the number corresponding to the difference Nv, and outputs the remainder N1 to the output section 106. These processes are repeated until the difference Nv becomes negative.

Exemplary Operation of Control Section

Next, an exemplary operation of the control section 30 according to the second embodiment is described. The conditions for the CPU 100 and the counter 108 are shown by Table 1. Table 3 shows set values of the parameters for operation of the control section 30. Table 4 shows the values of the parameters in each cycle.

TABLE 3

| | |
|---|---|
| t | 53.000 ms |
| Nd | 530 |
| Ni | 30 |
| N0 | 560 |
| Nv | 420 |
| N1 | 10 |

TABLE 4

| Cycle | Cycle Length (ms) | Time Elapsed (ms) | Count Value Ni at the End of Cycle | Number of Counts Nk During Cycle | Difference Nv | Output |
|---|---|---|---|---|---|---|
| 0 | | 0.000 | 30 | | 420 | x |
| 1 | 3.000 | 3.000 | 60 | 30 | 390 | x |
| 2 | 2.000 | 5.000 | 80 | 20 | 370 | x |
| 3 | 3.000 | 8.000 | 0 | 30 | 340 | x |
| 4 | 4.000 | 12.000 | 40 | 40 | 300 | x |
| 5 | 3.000 | 15.000 | 70 | 30 | 270 | x |
| 6 | 3.000 | 18.000 | 100 | 30 | 240 | x |
| 7 | 2.000 | 20.000 | 10 | 20 | 220 | x |
| 8 | 4.000 | 24.000 | 50 | 40 | 180 | x |
| 9 | 4.000 | 28.000 | 90 | 40 | 140 | x |
| 10 | 2.000 | 30.000 | 0 | 20 | 120 | x |
| 11 | 3.000 | 33.000 | 30 | 30 | 90 | x |
| 12 | 2.000 | 35.000 | 50 | 20 | 70 | x |
| 13 | 3.000 | 38.000 | 80 | 30 | 40 | x |
| 14 | 1.000 | 39.000 | 90 | 10 | 30 | x |
| 15 | 2.000 | 41.000 | 0 | 20 | 10 | x |
| 16 | 1.000 | 42.000 | 10 | 10 | 0 | x |
| 17 | 3.000 | 45.000 | 40 | 30 | −30 | ○ |

As shown in Table 3, the time t is 53 ms. In this case, the number of counts Nd of the counter 108 corresponding to the time t is 530. The count value Ni of the counter 108 at the time of sensing the rise a1 or the fall a3 of the sensing signal Sig1 is 30. Therefore, the count value N0 of the counter 108 after the elapse of the time t from the rise a1 or the fall a3 is supposed to be 560.

However, since the maximum countable value of the counter 108 is 110, the time t cannot be timed while the counter 108 makes one turn. Therefore, 550 (=N0) is divided by 110 (=Nu), and the remainder is calculated to be 10 (=N1). Thereby, it is figured out that the count value of the counter 108 after the elapse of the time t from the rise a1 or the fall a3 shall be 81.

However, as described above, the counter 108 makes a plurality of turns (five turns) before the elapse of the time t. If the CPU 100 outputs information of the remainder of 10 to the output section 106 immediately after the calculation of the remainder, the comparator 120 will determine that the time t has elapsed when the count value of the counter 108 becomes 10 for the first time.

In order to prevent this error, the CPU 100 performs calculation described below. In this example, the number of counts Nd of the counter 108 corresponding to 53 ms t) is 530, and the maximum countable value Nu of the counter 108 is 110. Therefore, the number Nd to be counted by the counter 108 is larger than the maximum countable value Nu by 420 (=Nv). This means that the count value of the counter 108 will be 10 (=N1) second to last when the counter 108 has counted 420 (=Nv) since the rise a1 or the fall a3. Therefore, the CPU 100 is required to wait to output the information of the remainder of 10 (=N1) to the output section 106 until the counter 108 finishes counting 420 (=Nv).

Specifically, the CPU 100 calculates a difference between the count value Nj (Nj1) of the counter 108 at the end of the present cycle and the count value Nj (Nj0) of the counter 108 at the end of the previous cycle, whereby the number Nk counted by the counter 108 during the present cycle is calculated. For example, the case of cycle 2 shown in Table 4 is described. The count value Nj (Nj 1) of the counter 108 at the end of cycle 2 is 80. Further, the count value Nj (Nj0) of the counter 108 at the end of cycle 1 is 60. It is therefore found that the number Nk counted by the counter 108 during cycle 2 is 20.

Next, the CPU 100 subtracts the number Nk from the difference Nv to obtain a new difference Nv. For example, as shown in FIG. 4, the difference Nv at the end of cycle 1 is 390, and accordingly, the difference Nv at the end of cycle 2 is 370 (390−20).

The CPU 100 repeats these processes until the difference Nv becomes negative. Then, when the difference Nv becomes negative, the CPU 100 outputs the information of remainder N1 to the output section 106.

Operation of Image Forming Apparatus

Next, an operation of the image forming apparatus 1 having the control section 30 according to the second embodiment is described. Hereinafter, paper carriage control for the image forming apparatus 1 to carry the paper P is described.

Figure 12:
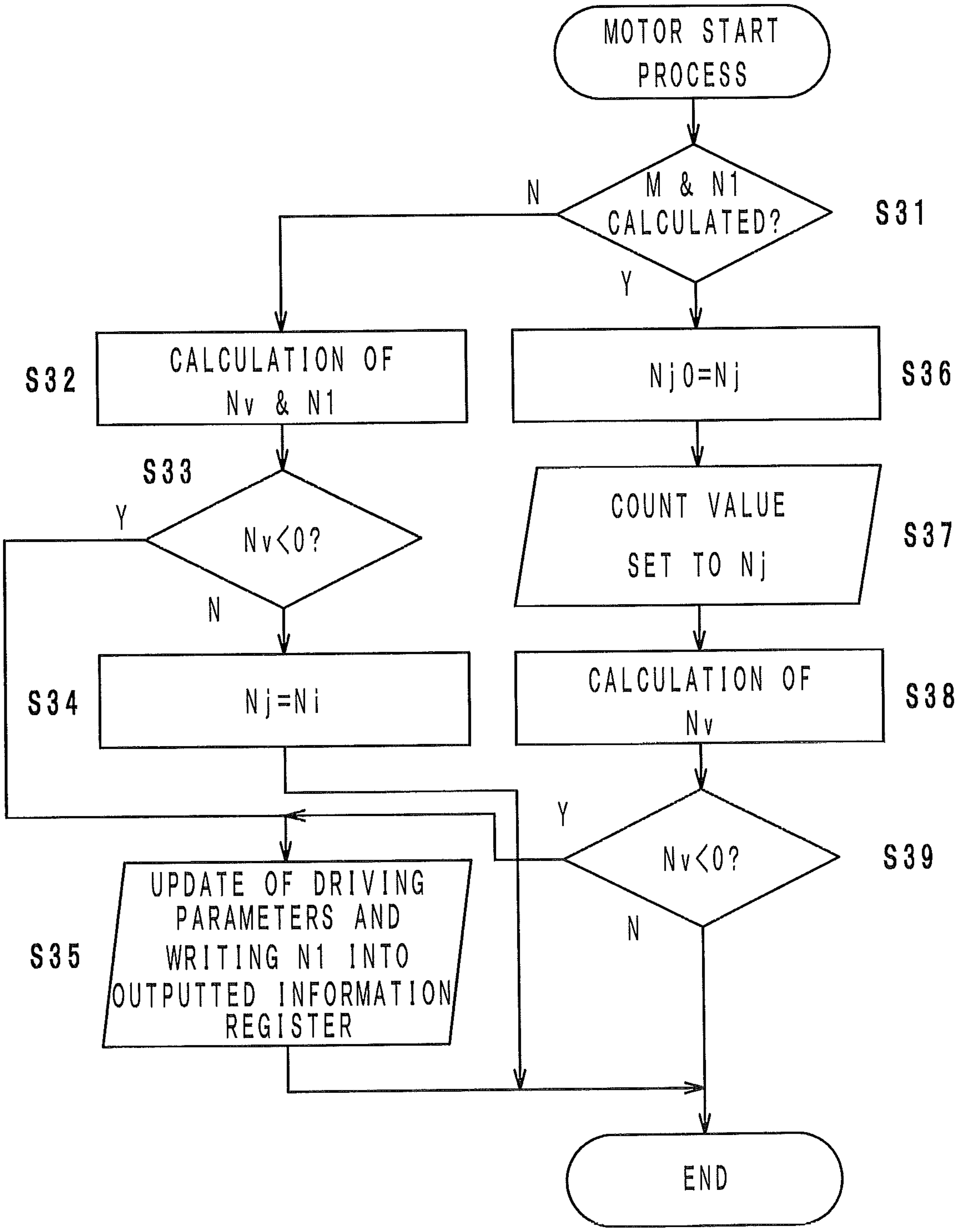
FIG. 12 is a flowchart showing an operation performed by the CPU for the motor start process shown in FIG. 7.
Figure 13:
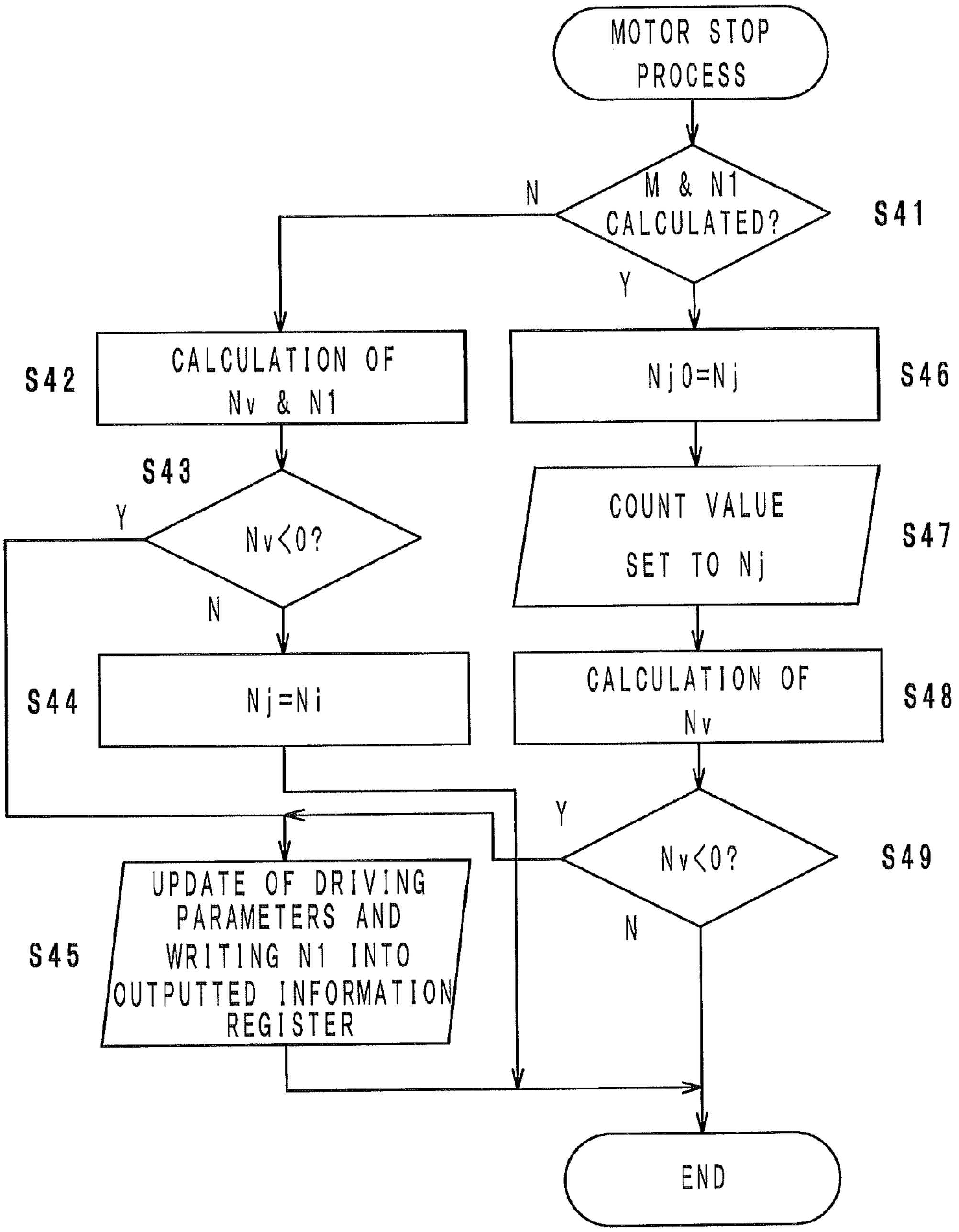
FIG. 13 is a flowchart showing an operation performed by the CPU for the motor stop process shown in FIG. 7.

It is to be noted that the operation of the image forming apparatus 1 having the control section 30 according to the second embodiment is different from the operation of the image forming apparatus 1 having the control section 30 according to the second embodiment only in the motor start process and the motor stop process. Accordingly, only the motor start process and the motor stop process are described below. FIG. 12 is a flowchart showing an operation performed by the CPU 100 for the motor start process shown in FIG. 7. FIG. 13 is a flowchart showing an operation performed by the CPU 100 for the motor stop process shown in FIG. 7.

First, the motor start process is described. The CPU 100 determines whether or not the value M and the remainder N1 have been calculated (step S31). When the calculations have not been made, the process goes to step S32. When the calculations have been made, the process goes to step S36.

When the calculations have not been made, the CPU 100 calculates the difference Nv and the remainder N1 (step S32). The calculations of the difference Nv and the remainder N1 have already been described, and detailed descriptions thereof are omitted here.

Next, the CPU 100 determines whether or not the difference Nv is smaller than 0 (step S33). At step S33, the CPU 100 determines whether or not to immediately output the information of the remainder N1 to the output section 106 based on whether or not the difference Nv is smaller than 0. When the difference Nv is not smaller than 0, the process goes to step S34. When the difference Nv is smaller than 0, the process goes to step S35.

When the difference Nv is not smaller than 0, the CPU 100 sets the count value Ni of the counter 108 at the time of sensing the rise a1 as the value Nj (step S34). The process is then completed.

When it is determined at step S31 that the calculations of the value M and the remainder N1 have not been made, the CPU 100 sets the value Nj at the end of the previous step as the value Nj0 (step S36). Further, the CPU 100 sets the current count value of the counter 108 as the value Nj (Nj1) (step S37).

Next, the CPU 100 calculates a new difference Nv (step S38). Specifically, the CPU 100 subtracts the value Nj0 from the value Nj1 to calculate the number Nk counted by the counter 108 during the present cycle. The CPU 100 then subtracts the number Nk from the difference Nv to calculate a new difference Nv.

The CPU 100 then determines whether or not the new difference Nv is negative (step S39). When the difference Nv is not negative, the process is completed. When the difference Nv is negative, the process goes to step S35.

At step S35, the CPU 100 writes the remainder N1 and a starting parameter into the outputted information register 118. In the output section 106, the rise a2 of the output signal Sig2 is generated based upon the count value of the counter 108 and the remainder N1 written in the outputted information register 118. That is, a motor starting command is issued. The process is then completed.

Next, the motor stop process is described. The CPU 100 determines whether or not the value M and the remainder N1 have been calculated (step S41). When the calculations have not been made, the process goes to step S42. When the calculations have been made, the process goes to step S46.

When the calculations have not been made, the CPU 100 calculates the difference Nv and the remainder N1 (step S42). The calculations of the difference Nv and the remainder N1 have already been described, and detailed descriptions thereof are omitted here.

The CPU 100 then determines whether or not the difference Nv is smaller than 0 (step S43). At step S43, the CPU 100 determines whether or not to immediately output the information of the remainder N1 to the output section 106 based on whether or not the difference Nv is smaller than 0. When the difference Nv is not smaller than 0, the process goes to step S44. When the difference Nv is smaller than 0, the process goes to step S45.

When the difference Nv is not smaller than 0, the CPU 100 sets the count value Ni of the counter 108 at the time of sensing the fall a3 as the value Nj (step S44). The process is then completed.

When it is determined at step S41 that the calculations of the value M and the remainder N1 having not been made, the CPU 100 sets the value Nj at the end of the previous cycle as the value Nj0 (step S46). Further, the CPU 100 sets the current count value of the counter 108 as the value Nj (Nj1) (step S47).

Next, the CPU 100 calculates a new difference Nv (step S48). Specifically, the CPU 100 subtracts the value Nj0 from the value Nj1 to calculate the number Nk counted by the counter 108 during the present cycle. The CPU 100 then subtracts the number Nk from the difference Nv to calculate a new difference Nv.

The CPU 100 then determines whether or not the new difference Nv is negative (step S49). When the difference Nv is not negative, the process is completed. When the difference Nv is negative, the process goes to step S45.

At step S45, the CPU 100 writes the remainder N1 and a starting parameter into the outputted information register 118. In the output section 106, the fall a4 of the output signal Sig2 is generated based upon the count value of the counter 108 and the remainder N1 written in the outputted information register 118. That is, a motor stopping command is issued. The process is then completed.

Effect

The image forming apparatus 1 having the control section 30 according to the second embodiment can be manufactured at low cost as the image forming apparatus 1 having the control section 30 according to the first embodiment is.

Further, malfunction of the image forming apparatus 1 can be suppressed even if the operation frequency of the CPU 100, that is, the second period Tr fluctuates. More specifically, in the image forming apparatus 1, when the counter 108 makes one or more turns during the timing of the time t, the CPU 100 waits for the period of M cycles to output the information of the remainder N1 to the output section 106. Here, that the counter 108 makes one or more turns during the timing of the time t means that the time t elapses from the generation of the rise a1 or the fall a3 after the counter 108 makes one or more turns. In this case, the count value of the counter 108 becomes equal to the remainder N1 a plurality of times during the timing of the time t, but when the count value of the counter 108 becomes equal to the remainder N1 for the last time, it indicates the elapse of the time t from the generation of the rise a1 or the fall a3. Hence, the CPU 100 needs to output the remainder N1 after the count value of the counter 108 becomes equal to the remainder N1 second to last.

The count value of the counter 108 becomes equal to the remainder N1 second to last when the counter 108 has counted the number corresponding to the difference Nv (Nd−Nu) since the generation of the rise a1 or the fall a3. The CPU 100 calculates the number Nk counted by the counter 108 during each cycle, and subtracts the number Nk from the difference Nv. When the difference Nv becomes negative, the CPU 100 determines that the counter 108 has counted over the number that is indicated by the count value corresponding to the remainder N1 that the counter 108 indicates second to last. Accordingly, the CPU 100 outputs the information of the remainder N1 to the output section 106. This enables the comparator 120 to read the count value from the outputted information register 118 at an accurate time. This consequently suppresses malfunction of the image forming apparatus 1.

Modifications

Figure 14:
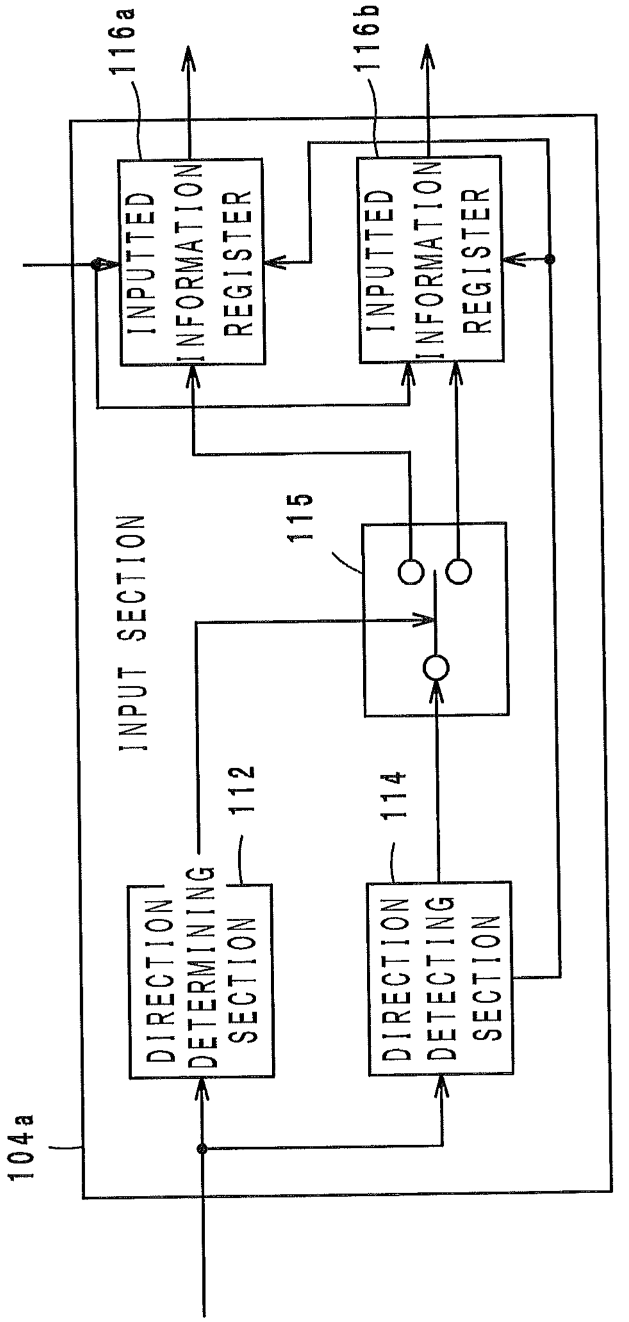
FIG. 14 is a configuration diagram of a first modified input section.

Hereinafter, a first modified input section is described with reference to the drawing. FIG. 14 is a configuration diagram of the first input section 104*a*.

The input section 104*a* can store a plurality of count values of the counter 108 at the times of generations of the rise a1 and the fall a3 of the sensing signal Sig1. Specifically, the input section 104*a* has a direction determining section 112, a direction detecting section 114, a selector 115, inputted information registers 116*a* and 116*b*. Since the direction determining section 112 and the direction detecting section 114 of the input section 104*a* are the same as those of the input section 104, descriptions thereof are omitted.

The selector 115 connects the direction detecting section 114 to either the inputted information register 116*a* or the inputted information register 116*b* based upon a direction bit outputted from the direction determining section 112. Specifically, when a direction bit of 1 indicating that the rise a1 of the sensing signal Sig1 has been sensed is outputted from the direction determining section 112, the selector 115 connects the direction detecting section 114 with the inputted information register 116*a*. On the other hand, when a direction bit of 0 indicating that the fall a3 of the sensing signal Sig1 has been sensed is outputted from the direction determining section 112, the selector 115 connects the direction detecting section 114 with the inputted information register 116*b*. This enables the inputted information register 116*a* to store the count value of the counter 108 at the time of generation of the rise a1 of the sensing signal Sig1, and enables the inputted information register 116*b* to store the count value of the counter 108 at the time of generation of the fall a3 of the sensing signal Sig1.

In the input section 104 shown in FIG. 2, when the time interval between the generation of the rise a1 of the sensing signal Sig1 and the generation of the fall a3 of the sensing signal Sig1 is shorter than the second period Tr of the operation frequency of the CPU 100, the following problem occurs. Specifically, in this case, in the input section 104, the fall a3 of the sensing signal Sig1 is generated before the count value of the counter 108 at the time of generation of the rise a1 of the sensing signal Sig1 is read by the CPU 100. This causes the count value of the counter 108 at the time of generation of the rise a1 of the sensing signal Sig1 stored in the inputted information register 116 to be overwritten with the count value of the counter 108 at the time of generation of the fall a3 of the sensing signal Sig1.

On the other hand, in the input section 104*a* shown in FIG. 14, the inputted information register 116*a* stores the count value of the counter 108 at the time of the generation of the rise a1 of the sensing signal Sig1, and the inputted information register 116*b* stores the count value of the counter 108 at the time of the generation of the fall a3 of the sensing signal Sig1. Therefore, the problem of overwriting, which may occur in the input section 104, does not occur in the input section 104*a*.

Figure 15:
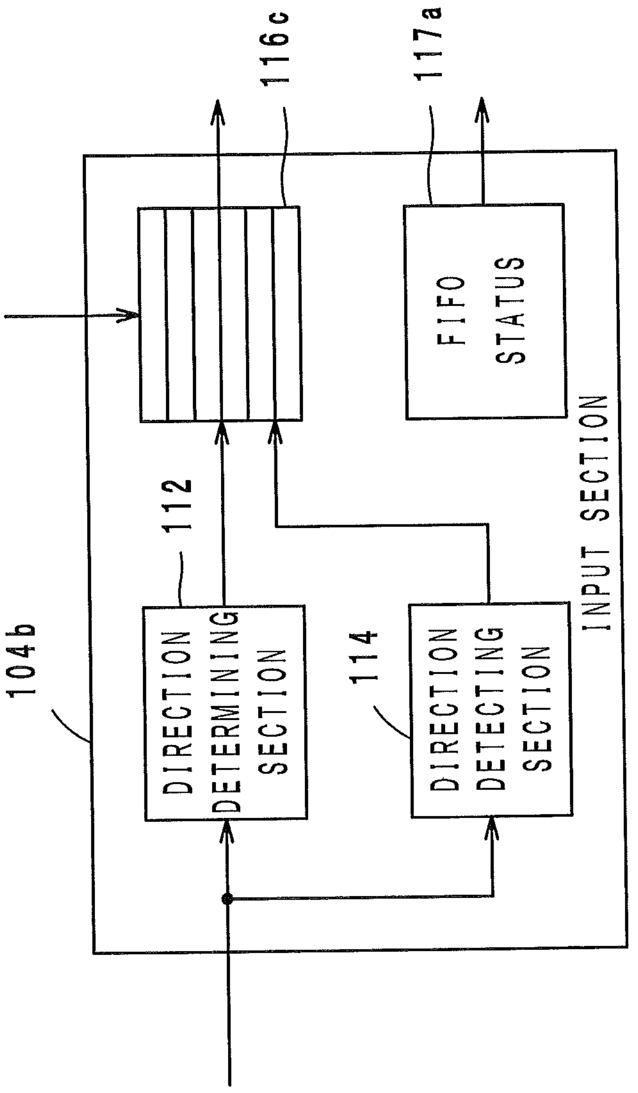
FIG. 15 is a configuration diagram of a second modified input section.

Next, a second modified input section with reference to the drawing. FIG. 15 is a configuration diagram of the second modified input section 104*b*.

The input section 104*b* can store a plurality of count values of the counter 108 at the times of generations of the rise a1 and the fall a3 of the sensing signal Sig1. Specifically, the input section 104*b* has a direction determining section 112, a direction detecting section 114, a FIFO (First In First Out) memory 116*c*, and a FIFO status 117*a*. Since the direction determining section 112 and the direction detecting section 114 of the input section 104*b* are the same as those of the input section 104, descriptions thereof are omitted.

The FIFO memory 116*c* can store a plurality of count values. More specifically, the FIFO memory 116*c* stores a plurality of count values, and outputs the earliest stored count value when a new count value is inputted thereto. It should be noted that the FIFO status 117*a* checks whether or not the count value inside the FIFO memory 116*c* has been read by the CPU 100.

Figure 16:
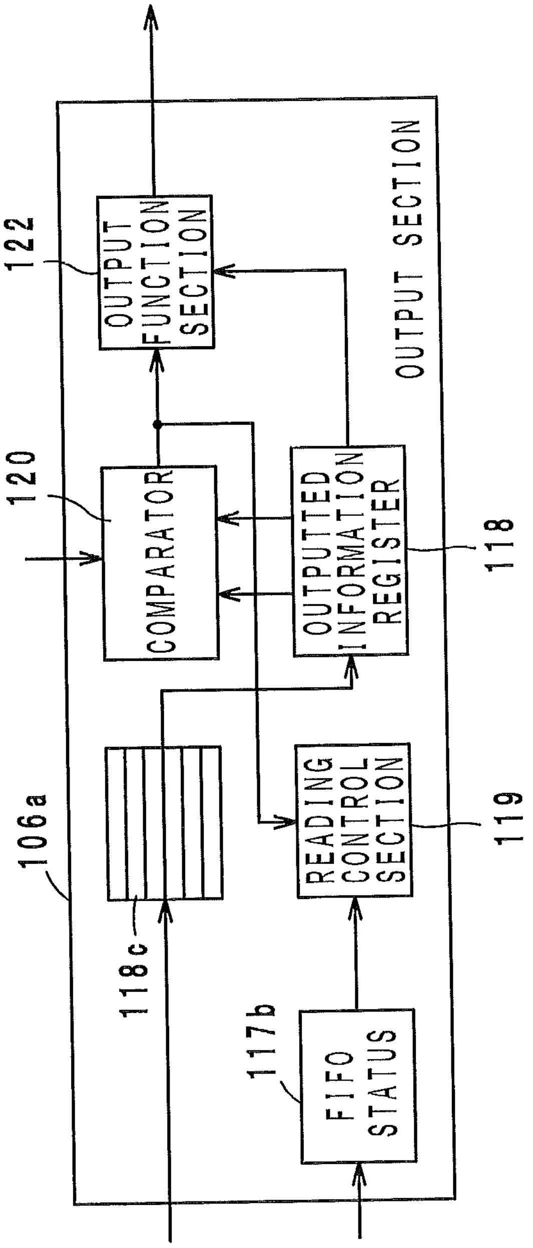
FIG. 16 is a configuration diagram of a first modified output section.

Next, a first modified output section is described with reference to the drawing. FIG. 16 is a configuration diagram of the first modified output section 106*a*. The output section 106*a* is used in combination with the input section 104*b*.

The output section 106*a* has a FIFO status 117*b*, an outputted information register 118, a FIFO memory 118*c*, a reading control section 119, a comparator 120, and an output function section 122. Since the outputted information register 118, the comparator 120 and the output function section 122 of the output section 106*a* are the same as those of the output section 106, descriptions thereof are omitted.

The FIFO memory 118*c* can store a plurality of count values. More specifically, the FIFO memory 118*c* stores a plurality of count values, and outputs the earliest stored count value to the outputted information register 118 when a new count value is sent from the CPU 100.

In the output section 106*a*, when the count value stored in the outputted information register 118 agrees with the count value of the counter 108, thereby generating an output trigger, the data outputted from the outputted information register 118 are written into the output function section 122, and the reading control section 119 checks the FIFO status 117*b* upon receipt of the output trigger. Then, unless the FIFO memory

118*c* is empty, the reading control section 119 reads next data and transfers the data to the outputted information register 118.

It is to be noted that in the control section 30, the second period Tr of the CPU 100 needs to be shorter than the time t between the generation of the rise a1 of the sensing signal Sig1 and the generation of the rise a2 of the output signal Sig2. If the time t is shorter than the second period Tr, the CPU 100 cannot operate within the time t.

Further, in the control section 30, the second period Tr of the operation frequency of the CPU 100 needs to be equal to or shorter than a half of a time Tu required for the counter 108 to make one turn. This is to avoid cases where the count value of the counter 108 at the moment of writing data into the outputted information register 118 is equal to the count value of the counter at the moment of outputting data from the outputted information register 118. In such cases, even a slight shift of the time of writing data prevents generations the rise a2 and the fall a4 of the output signal Sig2 at accurate times.

In addition, the sensor 34 may sense the paper P having reached a predetermined position of the carriage channel R, thereby generating the rise a1 of the sensing signal Sig1, and the CPU 100 may identify the position of the paper P in the carriage channel R based upon the count value of the counter 108 at the time of generation of the rise a1 and the current count value of the counter 108.

The control sections according to the embodiments above can be manufactured at low cost. By installing the control sections in image forming apparatus, malfunctions of the image forming apparatuses can be suppressed.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A control device for generating a second trigger with a delay of a predetermined time from generation of a first trigger, said control device comprising:

- a counter for counting numbers from 0 to n−1 at a frequency with cycles of a first period;
- a control section, which operates at a frequency with cycles of a second period that is longer than the first period, for calculating a remainder of a division by adding a number of counts of the counter corresponding to the predetermined time to a count value of the counter at the time of generation of the first trigger and by dividing a result of the addition by n; and
- an output section for outputting the second trigger at a time when the count value of the counter becomes equal to the remainder.

2. The control device according to claim 1, further comprising:

- a second storage section that stores the remainder calculated by the control section,
- wherein the output section outputs the second trigger at a time when the count value of the counter becomes equal to the remainder stored in the second storage section.

3. The control device according to claim 2, wherein in a case where the count value of the counter becomes equal to the remainder a plurality of times while the counter is counting for the predetermined time, the control section outputs the remainder to the second storage section after the count value of the counter becomes equal to the remainder second to last.

4. The control device according to claim 2, wherein in a case where a difference calculated by subtracting n from the number of counts of the counter corresponding to the predetermined time is positive, the control section outputs the remainder to the second storage section after the elapse of a number of cycles from generation of the first trigger, the number of cycles being calculated by dividing the difference by a number of counts of the counter corresponding to the second period and by rounding up a quotient of the division to unit.

5. The control apparatus according to claim 2, wherein, in a case where a difference calculated by subtracting n from the number of counts of the counter corresponding to the predetermined time is positive, the control section subtracts a number counted by the counter during each cycle from the difference and outputs the remainder to the second storage device in a cycle where a value obtained by the subtraction becomes negative.

6. The control device according to claim 2, further comprising:

- a first storage section that stores a count value of the counter at the time of generation of the first trigger,
- wherein the control section calculates a remainder of a division by adding a number of counts of the counter corresponding to the predetermined time to the count value of the counter stored in the first storage section and by dividing a result of the addition by n.

7. The control device according to claim 6, wherein the first storage section stores a plurality of count values of the counter at the times of generations of the first trigger.

8. The control device according to claim 7, wherein the first storage section is a FIFO memory.

9. The control device according to claim 7, wherein the second storage section stores a plurality of remainders calculated from the respective count values of the counter at the times of generations of the first trigger.

10. The control device according to claim 9, wherein the second storage section is a FIFO memory.

11. An image forming apparatus, comprising the control apparatus according to claim 1.

12. The image forming apparatus according to claim 11, further comprising:

- a carriage device that carries a print medium in a carriage channel; and
- a sensing device that senses the print medium having reached a predetermined position of the carriage channel and generates the first trigger,
- wherein the control section identifies a position of the print medium in the carriage channel based upon a count value of the counter at the time of generation of the first trigger and a current count value of the counter.

13. A control method for generating a second trigger with a delay of a predetermined time from generation of a first trigger, said control method comprising the steps of:

- counting numbers from 0 to n−1 at a frequency with cycles of a first period with a counter;
- calculating a remainder a division with a control section, which operates at a frequency with cycles of a second period that is longer than the first period, by adding a number of counts of the counter corresponding to the predetermined time to a count value of the counter at the time of generation of the first trigger and by dividing a result of the addition by n; and
- outputting the second trigger from an output section at a time when the count value of the counter becomes equal to the remainder.

14. The control method according to claim 13, further comprising a step of storing the remainder calculated by the control section in a second storage section, wherein the second trigger is outputted at a time when the count value of the counter becomes equal to the remainder stored in the second storage section.

15. The control method according to claim 14, wherein in a case where the count value of the counter becomes equal to the remainder a plurality of times while the counter is counting for the predetermined time, the control section outputs the remainder to the second storage section after the count value of the counter becomes equal to the remainder second to last.

16. The control method according to claim 13, wherein in a case where a difference calculated by subtracting n from the number of counts of the counter corresponding to the predetermined time is positive, the control section outputs the remainder to the second storage section after the elapse of a number of cycles from generation of the first trigger, the number of cycles being calculated by dividing the difference by a number of counts of the counter corresponding to the second period and by rounding up a quotient of the division to unit.

17. A non-transitory computer readable storage medium stored with a control program which, when executed, causes a processor to carry out a method for generating a second trigger with a delay of a predetermined time from generation of a first trigger, said method comprising the steps of:

counting numbers from 0 to n−1 at a frequency with cycles of a first period with a counter;

calculating a remainder a division with a control section, which operates at a frequency with cycles of a second period that is longer than the first period, by adding a number of counts of the counter corresponding to the predetermined time to a count value of the counter at the time of generation of the first trigger and by dividing a result of the addition by n; and outputting the second trigger from an output section at a time when the count value of the counter becomes equal to the remainder.

18. The non-transitory computer readable storage medium according to claim 17, wherein the method further comprising a step of storing the remainder calculated by the control section in a second storage section; and wherein the second trigger is outputted at a time when the count value of the counter becomes equal to the remainder stored in the second storage section.

19. The non-transitory computer readable storage medium according to claim 18, wherein in a case where the count value of the counter becomes equal to the remainder a plurality of times while the counter is counting for the predetermined time, the control section outputs the remainder to the second storage section after the count value of the counter becomes equal to the remainder second to last.

20. The non-transitory computer readable storage medium according to claim 18, wherein in a case where a difference calculated by subtracting n from the number of counts of the counter corresponding to the predetermined time is positive, the control section outputs the remainder to the second storage section after the elapse of a number of cycles from generation of the first trigger, the number of cycles being calculated by dividing the difference by a number of counts of the counter corresponding to the second period and by rounding up a quotient of the division to unit.

* * * * *